US012613072B1

(12) United States Patent
Barreto et al.

(10) Patent No.: US 12,613,072 B1
(45) Date of Patent: Apr. 28, 2026

(54) FLUID PRESSURE DAMPENER WITH STRUCTURALLY IMPROVED BAFFLES

(71) Applicants: Daniel Barreto, Horseshoe Bend, ID (US); Zane Jesser, Kimberly, ID (US)

(72) Inventors: Daniel Barreto, Horseshoe Bend, ID (US); Zane Jesser, Kimberly, ID (US)

( * ) Notice: Subject to any disclaimer, the term of this patent is extended or adjusted under 35 U.S.C. 154(b) by 0 days.

(21) Appl. No.: 19/353,569

(22) Filed: Oct. 8, 2025

(51) Int. Cl.
*F41A 21/30* (2006.01)
*G10K 11/00* (2006.01)

(52) U.S. Cl.
CPC ............ *F41A 21/30* (2013.01); *G10K 11/002* (2013.01)

(58) Field of Classification Search
CPC ........................................................ F41A 21/30
USPC ............................................ 181/223; 89/14.2
See application file for complete search history.

(56) References Cited

U.S. PATENT DOCUMENTS

| | | | | |
|---|---|---|---|---|
| 916,885 | A | 3/1909 | Maxim | |
| 3,385,164 | A * | 5/1968 | Hubner | F41A 21/30 181/269 |
| 3,759,134 | A | 9/1973 | Cox et al. | |
| 7,412,917 | B2 | 8/2008 | Vais | |
| 8,844,422 | B1 | 9/2014 | Klett | |
| 9,441,900 | B1 | 9/2016 | Parrish | |
| 10,330,418 | B2 | 6/2019 | Washburn, III et al. | |
| 10,753,699 | B2 | 8/2020 | Klett et al. | |
| 10,890,404 | B2 | 1/2021 | Petersen | |
| 11,125,523 | B2 * | 9/2021 | Petersen | F41A 21/30 |
| 11,428,489 | B2 | 8/2022 | Petersen | |
| 11,428,490 | B2 | 8/2022 | Buchel | |
| 11,725,898 | B2 | 8/2023 | Muceus et al. | |
| 11,835,314 | B2 | 12/2023 | Walker | |
| 11,982,391 | B2 | 5/2024 | Schenker et al. | |
| 12,018,905 | B2 * | 6/2024 | DeJessa | F41A 21/30 |
| 2014/0262604 | A1 | 9/2014 | Proske | |
| 2016/0018178 | A1 | 1/2016 | Johansen | |
| 2019/0257607 | A1 | 8/2019 | Dobrinescu | |
| 2020/0025491 | A1 | 1/2020 | Petersen | |
| 2020/0025496 | A1 | 1/2020 | Parker | |
| 2020/0284541 | A1 | 9/2020 | Poling | |
| 2021/0108875 | A1 | 4/2021 | Hibbitts et al. | |
| 2021/0207916 | A1 | 7/2021 | Belykov et al. | |
| 2022/0276016 | A1 | 9/2022 | Dueck et al. | |
| 2023/0021170 | A1 | 1/2023 | Dueck et al. | |
| 2024/0255248 | A1 | 8/2024 | Kunsky | |

* cited by examiner

*Primary Examiner* — Reginald S Tillman, Jr.
(74) *Attorney, Agent, or Firm* — Burdick Patents, P.A.; Sean D. Burdick; Colin L. Honan

(57) ABSTRACT

A suppressor has an outer shell with a bore defined along a central longitudinal axis of the shell and fluidically coupling an entrance port to an exit port. Baffles enclosed within the outer shell each have a central aperture circumvolving the bore and a deflecting channel radially offset from the bore and in fluid communication with the central aperture. Each deflecting channel is formed by opposing sidewalls formed in a baffle and extending to a diversion wall. First and second openings of a deflecting channel fluidically couple the channel with the bore and with the volume enclosed by the outer shell. Each deflecting channel deflects propellant gases in a direction perpendicular to axial flow through the bore.

20 Claims, 9 Drawing Sheets

SECTION A-A

SECTION A-A

SECTION A-A

SECTION B-B

SECTION C-C

SECTION A-A

SECTION D-D

SECTION D-D

SECTION E-E

SECTION F-F

SECTION G-G

SECTION G-G

SECTION H-H

SECTION I-I

FLUID PRESSURE DAMPENER WITH STRUCTURALLY IMPROVED BAFFLES

RELATED APPLICATIONS

This application claims priority to U.S. Provisional Application 63/862,196 filed Aug. 12, 2025, the contents of which are fully incorporated herein by reference.

BACKGROUND OF THE INVENTION

Field of the Invention

The present invention relates generally to fluid pressure dampeners, and, more specifically, to suppressors for firearms.

Description of Related Art

Fluid pressure dampeners are generally known and have various applications, such as mufflers for automobile exhaust, pulsation dampeners for fluid flow, and suppressors for firearms. Suppressors for firearms are designed to attach to the muzzle end of the firearm and serve to effectively lengthen the bore of the firearm which propellant gases must travel through. The propellant gases are generated upon firing an ammunition cartridge loaded into the firearm. The enclosed firing chamber forces the propellant gases to propel a projectile forward and out of the muzzle end. The propellant gases trail behind the projectile.

Early suppressor designs, such as that described in U.S. Pat. No. 916,885, utilized a series of chambers enclosed within a tube and arranged around the central bore. The internal chambers in the '885 patent were designed to temporarily trap trailing propellant gases to slow the velocity of the gases prior to exiting the suppressor. Later suppressor designs replaced the internal chambers with a series of internal baffle structures to divert trailing propellant gases away from the central bore into expansion chambers to slow gas velocity and lower the energy released behind the projectile and thus reduce the decibel output. The baffles are typically metal dividers that fit within the diameter of the outer tube and form the individual expansion chambers within the tube, i.e., an expansion chamber is formed between any two adjacent baffles.

Many modern suppressors use clipped baffles to increase gas diversion within the suppressor and away from the bore axis. Clipped baffles generally refer to baffles that have a notch or key-hole clipped from along the outer diameter of the central baffle aperture. In some suppressors, the clip is formed in each baffle and are axially aligned with one another along the longitudinal axis. The clips essentially form a secondary flow path offset from the bore axis.

The problem with existing clipped baffles is that clipping structurally weakens the baffle and introduces concentrated stress points. Existing clipped baffles may structurally fail after repeated impacts from the high velocity propellant gases, diminishing the effectiveness of those suppressors. Further, with the existing clipped baffle design forming a secondary flow path, some amount of gas is able to flow uninterrupted longitudinally through the suppressor until reaching the distal end of the suppressor, which diminishes the decibel reduction provided by the suppressor.

What is needed is an improved suppressor that has a new baffle design that is structurally reinforced and diverts gases away from the bore.

SUMMARY OF THE INVENTION

A fluid pressure dampener according to the present invention maximizes the decibel reduction while improving the structural integrity of the individual baffles enclosed within the dampener. The present invention has eliminated the weak points created in existing clipped baffles while maintaining the advantageous effects that clipping provides to fluid pressure dampening systems, such as suppressors. The structurally improved baffles according to aspects of the present invention increase lateral deflection of flowing gases away from the bore axis and promote mixing of these gases in the bore axis to further dissipate the energy of the gases and reduce the decibel output generated.

In one embodiment, the fluid pressure dampener according to the present invention has an outer shell that includes an entrance port and an exit port. A bore is defined through the outer shell. The bore fluidically couples the entrance port with the exit port and defines the longitudinal axis of the dampener. One or more baffles are enclosed within the outer shell. Each baffle has a central aperture defined therethrough that circumvolves the bore. Each baffle also includes a deflecting channel that is in fluid communication with the central aperture and radially offset from the bore.

In some preferred embodiments, the dampener includes a plurality of baffles arranged within the outer shell between the entrance port and the exit port. Preferably, the baffles are spaced apart along the longitudinal axis. In some embodiments, the spacing between baffles is uniform. In alternative embodiments, the spacing between baffles diminishes in the direction of the exit port, e.g., the space between two adjacent baffles that is nearer to the exit port is smaller than the space between two adjacent baffles that is nearer to the entrance port. An expansion chamber is formed between any two adjacent baffles among the plurality of baffles. Preferably, the deflecting channel formed on an upstream baffle extends partially into the expansion chamber formed between that upstream baffle and the adjacent downstream baffle.

Preferably, the deflecting channels formed in the plurality of baffles are axially aligned with one another. In some embodiments, the dampener includes deflecting channels having at least two different volumes. The volume of the deflecting channel may be a function of axial displacement of the baffle from the entrance port. In some examples, the volume of the deflecting channel for the baffle nearer the entrance port is less than the volume of the deflecting channel nearer the exit port, i.e., the volume of the deflecting channel may increase as a function of axial displacement of the baffle from the entrance port. In alternative embodiments, the opposite may be true so that the volume of the deflecting channel in the baffle nearer the entrance port is greater than the volume of the deflecting channel in the baffle nearer the exit port, i.e., the volume of the deflecting channel may decrease as a function of axial displacement of the baffle from the entrance port.

In some embodiments, at least one baffle has the form of a truncated cone concentrically aligned with the longitudinal axis. The deflecting channel may include a first opening formed through an outer surface of the truncated cone and a second opening that is in fluid communication with the bore. The deflecting channel may be formed by opposing sidewalls formed in the truncated cone and extending to a diversion wall. The diversion wall is preferably substantially perpendicular to the longitudinal axis. The diversion wall extends between the first opening and the second opening. The diversion wall is designed to divert propellant gases in a direction that is perpendicular to the bore. In some embodiments, the diversion wall includes a support fin formed on a downstream surface and connected to the inner surface of the truncated cone. One or more ports or vent holes may be defined through the diversion wall.

In some embodiments of the present invention, a baffle for a fluid pressure dampener is disclosed. The baffle has a body and a flange extending radially outward from the body. A central aperture is defined through the body and a deflecting channel is formed in the body. The central aperture defines a flow axis through the baffle. The deflecting channel is in fluid communication with the central aperture and is radially offset from the flow axis. In some preferred embodiments, the deflecting channel has opposing sidewalls formed in the body and extending to a diversion wall. The diversion wall is preferably perpendicular to the flow axis. In some embodiments, a support fin may be formed on a downstream surface of the diversion wall and extend from the flange. Preferably, an end of the diversion wall forms a perimetric edge of the central aperture. The deflecting channel is designed to divert gases in a direction substantially perpendicular to the flow axis.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments of fluid pressure dampeners that have an improved baffle design. The baffles utilized in the fluid pressure dampener according to the present invention are structurally reinforced and have eliminated the weak points created by conventional clipping while improving upon the gas deflection characteristics provided by clipped baffles. In some preferred embodiments, the fluid pressure dampener according to the present invention is a suppressor designed for use with firearms. However, it should be understood that the inventive principles disclosed herein may be applied to other fluid systems where sound reduction is desired, such as in mufflers for automobile exhaust and fuel mixers for jet engines. The skilled artisan will recognize many other applications of the disclosed invention beyond those provided in the specific embodiments discussed below.

The fluid pressure dampener, or suppressor as it may be referred to herein, according to the present invention has an improved baffle design that is structurally reinforced and designed to divert gases that are traveling through the suppressor laterally. The improved baffle design according to the present invention eliminates the secondary flow path created by existing clipped baffles and thus increases the decibel reduction provided by the inventive suppressor. Each baffle contained within a suppressor according to the present invention has a channel designed to divert gases in a direction that is perpendicular to the bore.

A suppressor according to the present invention is sized according to the firearm for which it is intended. The suppressor may be sized to accommodate virtually any conventional or unconventional caliber of ammunition. In some preferred embodiments, the suppressor is designed for small arms ammunition, e.g., up to .50 caliber ammunition, but it can be readily scaled up to accommodate calibers beyond .50 caliber ammunition.

Figure 1:
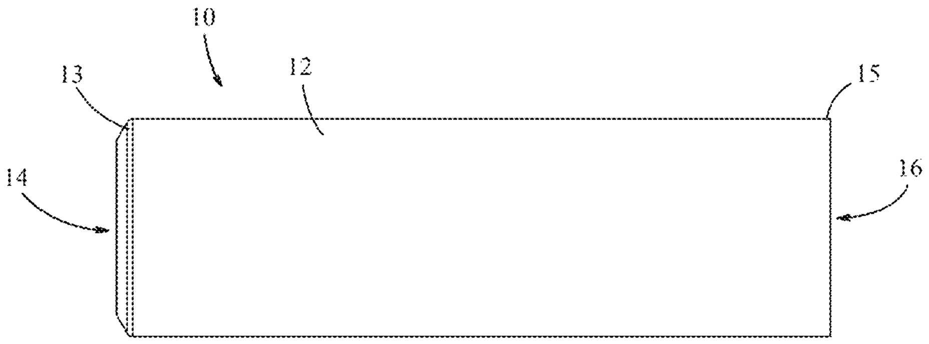
FIG. 1 is a side view of a first embodiment of a suppressor according to the present invention.

FIG. 1 is a side view of a first embodiment of a fluid pressure dampener according to the present invention. The inventive fluid pressure dampener is embodied in a suppressor 10. Reference to suppressor 10 throughout the following disclosure should be interpreted in a nonlimiting manner as the inventive principles disclosed herein may be embodied in various other types of fluid pressure dampeners. The suppressor 10 has an outer shell 12. The proximal end 13 of the outer shell 12 includes an entrance port 14 and the distal end 15 includes an exit port 16 that is fluidically connected with the entrance port 14. In preferred embodiments, the outer shell 12 is substantially cylindrically shaped.

Throughout the following disclosure, the terms upstream and downstream may be used to orient the reader with regard to the figures. It should be understood that the upstream direction is in the direction of the entrance port 14 and the downstream direction is in the direction of the exit port 16. A component that is described as being upstream to another component is understood to mean that the upstream component is closer to the entrance port 14 than the other component. An upstream side or surface is a side that is oriented toward the entrance port 14 and a downstream side or surface is a side that is oriented toward the exit port 16.

Figure 2:
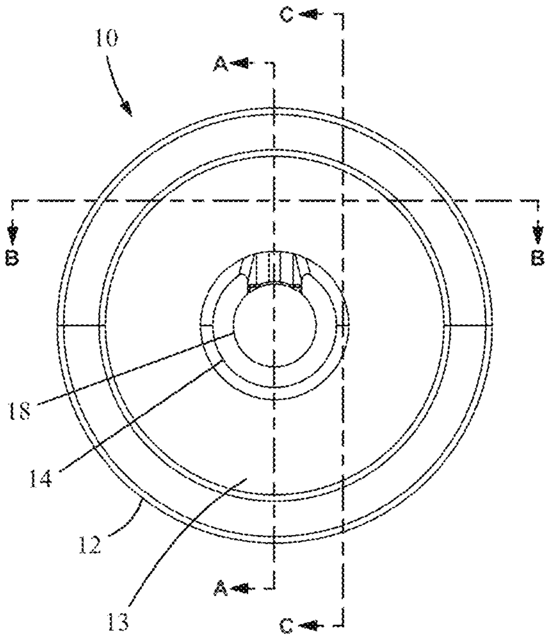
FIG. 2 is a proximal end view of the embodiment of FIG. 1.

FIG. 2 is proximal end view of the first embodiment of a suppressor according to the present invention. A bore 18 is defined through the outer shell 12 and fluidically couples the entrance port 14 with the exit port 16. The bore 18 defines the longitudinal axis, or bore axis as it may be referred to herein, through the outer shell 12 of the suppressor 10. In preferred embodiments, the bore 18 is linear. The bore 18 preferably has a diameter that is substantially equal to the diameter of the firearm bore the suppressor 10 is designed for, i.e., the diameter of the bore 18 is determined according to the caliber of ammunition for which the suppressor 10 is designed.

Figure 3A:
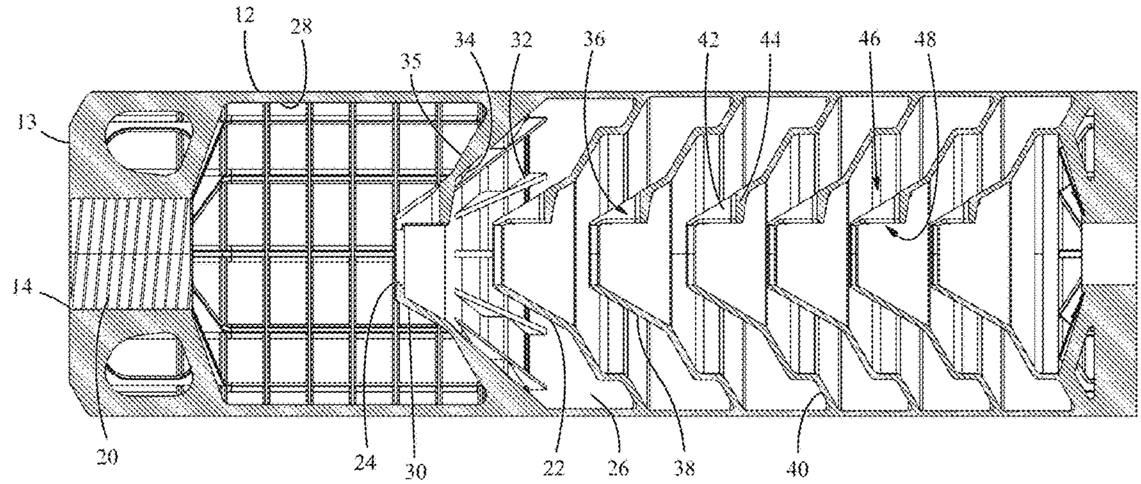
FIG. 3A is a cross-sectional side view of the suppressor, taken along line A-A of FIG. 2.

FIG. 3A is a cross-sectional view, taken along line A-A, of the first embodiment of a suppressor according to the present invention. The proximal end 13 of the outer shell 12 includes a means for mounting the suppressor 10 to the muzzle of a firearm. In some embodiments, the mounting means 20 may be threads formed around an inner surface of the entrance port 14. In alternative embodiments, the mounting means 20 may be an integrated quick detach mount, as is known in the industry. For simplicity's sake, the mounting means 20 includes and may be referred to herein as internal threads 20.

The outer shell 12 encloses one or more baffles 22. Each baffle 22 includes an aperture 24 that is concentrically aligned with the bore 18. Preferably, a plurality of baffles 22 is spaced apart within the outer shell 12. An expansion chamber 26 is formed between any two adjacent baffles 22 within the outer shell 12. An expansion chamber 26 should be understood to be the volume, or space, between any two adjacent baffles 22 and the inner surface 28 of the outer shell 12. In some embodiments, the first baffle or blast baffle 30 includes a plurality of support fins 32 extending radially from a downstream surface 34 around the aperture 24. In preferred embodiments, the support fins 32 are integrally formed with the inner surface 28 of the outer shell 12. The blast baffle 30 is thus structurally reinforced when compared to the downstream baffles 22. The reinforcement to the blast baffle 30 provided by the integrated support fins 32 may be necessary in some embodiments given that the blast baffle 30 will receive the initial impact from the high velocity propellant gases entering the suppressor 10.

Note, reference throughout the following disclosure generally to baffle 22 should be understood to be inclusive of the blast baffle 30 unless otherwise explicitly noted. Any feature unique to the blast baffle 30, such as the integrated support fins 32, will be separately called out in relation only to the blast baffle 30. Features that are common among the blast baffle 30 and each downstream baffle 22 will be described generally in relation to a baffle 22 with the understanding that such feature is present among all baffles 22 and 30.

In preferred embodiments, the plurality of baffles 22 are equally spaced apart along the longitudinal axis. In alternative embodiments, the axial spacing between the baffles 22 may diminish in the downstream direction so that the volume of an expansion chamber 26 decreases in the downstream direction.

Each baffle 22, including the blast baffle 30, is formed with a deflecting channel 36 that is in fluid communication with the central aperture 24 of that baffle 22 and thus the bore 18. The deflecting channel 36 is radially offset from the bore 18. In preferred embodiments, each deflecting channel 36 among the plurality of deflecting channels 36 is axially aligned with an adjacent deflecting channel 36. In some preferred embodiments, each baffle 22 and 30 is formed as a truncated cone 38 concentrically aligned with the bore 18. A flange 40 extends radially outward from the truncated cone 38 to the inner surface 28 of the outer shell 12. The flange 40 may be stepped, as shown in FIG. 3A.

Each deflecting channel 36 may extend partially into its downstream expansion chamber 26 formed between two adjacent baffles 22. The deflecting channel 36 is preferably formed of opposing sidewalls 42 that extend to a diversion wall 44. Note, only one of the opposing sidewalls 42 is visible in FIG. 3A due to the cross-section. The opposing sidewalls 42 are formed in the truncated cone 38. The opposing sidewalls 42 begin at the central aperture 24 of each baffle 22 and extend downstream to the diversion wall 44. The deflecting channel 36 preferably has a first opening 46 defined through an upstream surface 35 of the truncated cone 38 and a second opening 48 that is in fluid communication with the bore 18. The diversion wall 44 extends between the first opening 46 and the second opening 48. The diversion wall 44 prevents gases from flowing in a straight line through the deflecting channel 36. When the gases propagating downstream reach the diversion wall 44, the gases are deflected laterally through each of the first opening 46 and the second opening 48.

Figure 3B:
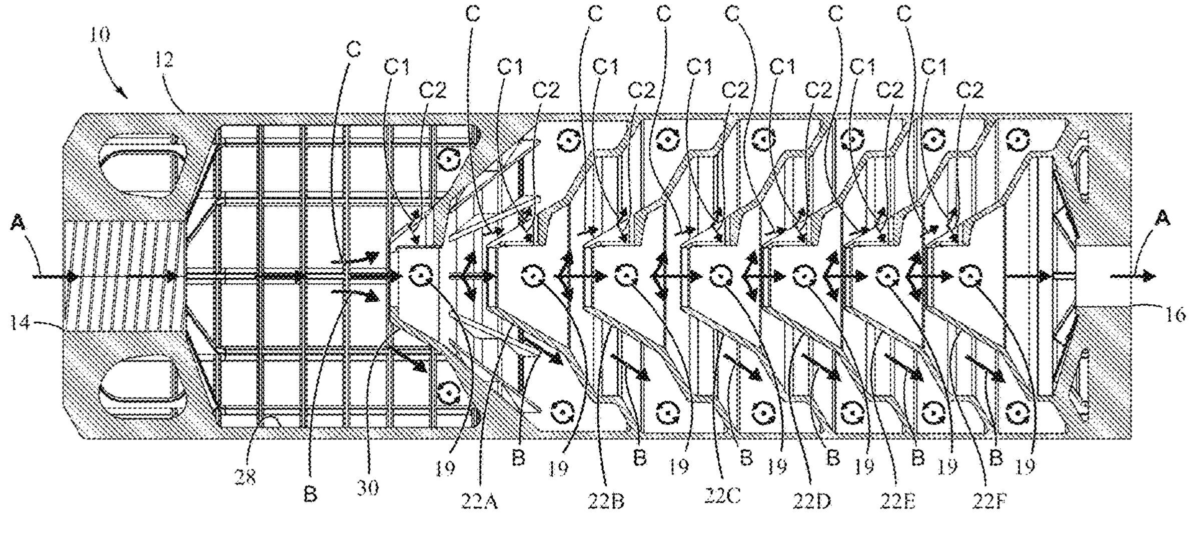
FIG. 3B is also a cross-sectional side view of the suppressor, taken along line A-A of FIG. 2, with markings indicating various flow paths through the suppressor.

FIG. 3B is a cross-sectional view taken along lines A-A of suppressor 10. FIG. 3B illustrates a pattern of flow paths through the suppressor 10 according to the present invention. The primary flow path is flow path A. Flow path A generally follows the bore 18 through the suppressor 10. A projectile discharged from a firearm coupled to suppressor 10 will travel in a straight line through the bore 18. Propellant gases generated from discharging the firearm trail behind the projectile generally along flow path A. As the gases approach the blast baffle 30, some amount of the gas is diverted radially outward into flow path B and into flow path C, that is, flow path A splits into flow path B and flow path C. Gases following flow path B travel along the upstream surface of the baffle 30 (or 22) before reaching the inner surface 28 of the outer shell 12, at which point the gases are deflected and may swirl back toward the bore 18.

Additionally, some amount of the gas is deflected from flow path A into flow path C where the gas enters the deflecting channel 36 and the flow is deflected again by the diversion wall 44. Upon impacting the diversion wall 44 along flow path C, gases are deflected laterally along flow path C1 through the first opening 46 and along flow path C2 through the second opening 48. Gas following flow path C1 is diverted outward toward the inner surface 28 of the outer shell 12. This gas is deflected and swirled within an expansion chamber 26, similar to gas following flow path B, before being redirected back toward the bore 18. Some amount of the gas following flow path C is also deflected into flow path C2 through the second opening 48 by the diversion wall 44. This gas immediately reenters the bore 18 and creates a mixing zone 19 with the gas trailing behind a projectile along flow path A. Note, the mixing zone 19 is generally described as the area below the second opening 48 within the bore 18. The mixing zone 19 creates further turbulence in the gas flowing along flow path A to promote subsequent deflection from flow path A into flow path B and flow path C downstream. The effect of this increased turbulence and diversion of gas into flow path B and flow path C is to dissipate the energy of the gas and reduce the velocity thereof causing a significant reduction to the decibel level generated when the gas eventually ejects from the exit port 16.

Note, the flow generally described above with regard to flow path B and flow path C is true through the length of the suppressor 10 for each subsequent baffle 22 enclosed therein. In FIG. 3B, by the time gas reaches the final baffle 22F, the energy and velocity of the gas has been significantly diminished. The amount of gas diverted by baffle 22F into either flow path B or flow path C may be significantly less than that diverted by the blast baffle 30.

Figure 4:
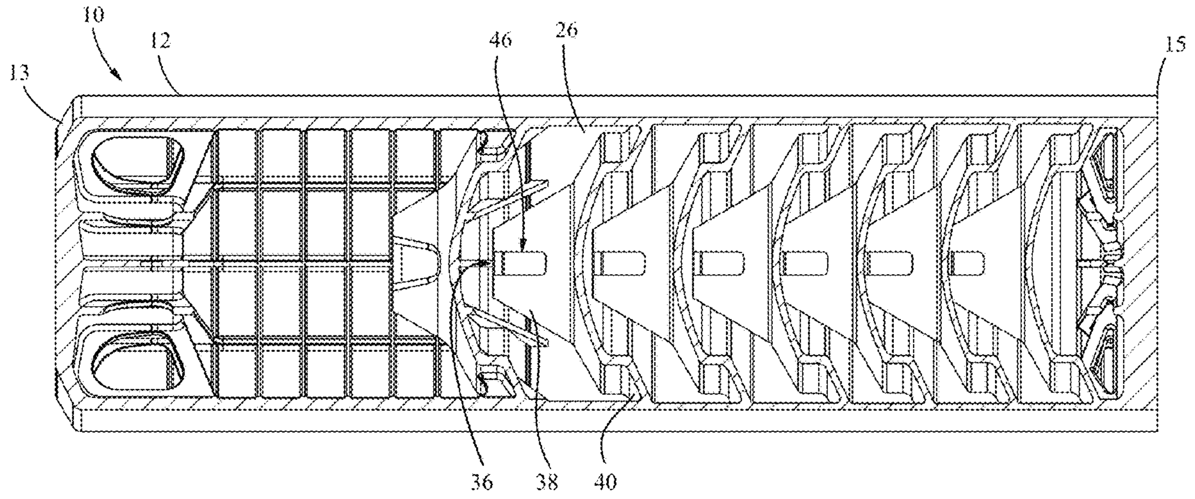
FIG. 4 is a cross-sectional side view of the suppressor, taken along line B-B of FIG. 2.

FIG. 4 is a cross-sectional view, taken along line B-B, of the first embodiment of a suppressor according to the present invention. The first opening 46 fluidically connects the deflecting channel 36 with the expansion chamber 26 that is upstream of its baffle 22. The diversion wall 44 may deflect gases laterally through the first opening 44 into an expansion chamber 26.

In some preferred embodiments, each deflecting channel 36 has a substantially rectangular profile formed by the opposing sidewalls 42 and the diversion wall 44. In alternative embodiments, each deflecting channel 36 may have an oblong profile.

Each deflecting channel 36 is designed to deflect gases traveling through the suppressor 10 in a direction that is perpendicular to the bore 18. In one example, when a bullet is fired through the suppressor 10, propellant gases trail behind the bullet to propel the bullet. Some amount of propellant gases traveling through the suppressor 10 will be deflected by the upstream surface of each baffle 22 while another amount of the gas travels unimpeded through the bore 18. The deflecting channel 36 is designed so that some of the gas traveling through the bore 18 will impact the diversion wall 44 to be deflected perpendicularly to the bore 18. Some amount of this deflected gas will pass through the first opening 46 back into an expansion chamber 26 while another amount of the deflected gas may pass through the second opening 48 back into the bore 18. The gases deflected through the second opening 48 back into the bore 18 mix with and disrupt the normal flow of the gases trailing behind the bullet. The suppressor 10 thus slows the velocity and reduces the pressure of a majority of the gas traveling therethrough by prolonging the time the gas spends in the suppressor 10 by diverting the gas laterally into the larger volumes of the expansion chambers 26. This has the effect of slowing the velocity of these gases which reduces the decibel output generated when the gases are expelled through the exit port 16.

Figure 5:
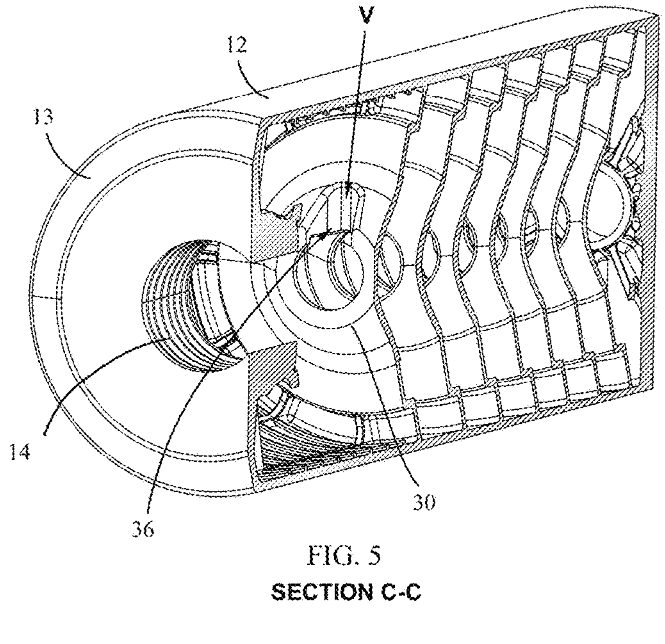
FIG. 5 is a cross-sectional frontal perspective view of the suppressor, taken along line C-C of FIG. 2.

FIG. 5 is a frontal perspective cross-sectional view, taken along lines C-C, of the first embodiment of a suppressor according to the present invention. Each deflecting channel 36 has a volume V defined by the opposing sidewalls 42, the diversion wall 44 and an imaginary plane following the outer or upstream surface of the truncated cone 38 covering the first opening 46 and a second imaginary plane covering the second opening 48. In some embodiments, the volume V of the deflecting channel 36 for any two baffles 22 may be different. In alternative embodiments, the volume V is uniform among the deflecting channels 36 for each of the plurality of baffles 22. In preferred embodiments, the volume V of the deflecting channel 36 changes as a function of the axial displacement of that baffle 22 from the entrance port 14. The volume V may decrease with each baffle 22 sequentially downstream from the entrance port 14. Alternatively, the volume V may increase with each baffle 22 sequentially downstream from the entrance port 14. Thus, in some embodiments, the volume V for the deflecting channel 36 of the blast baffle 30 is larger than the volume V of every downstream deflecting channel 36.

Figure 6:
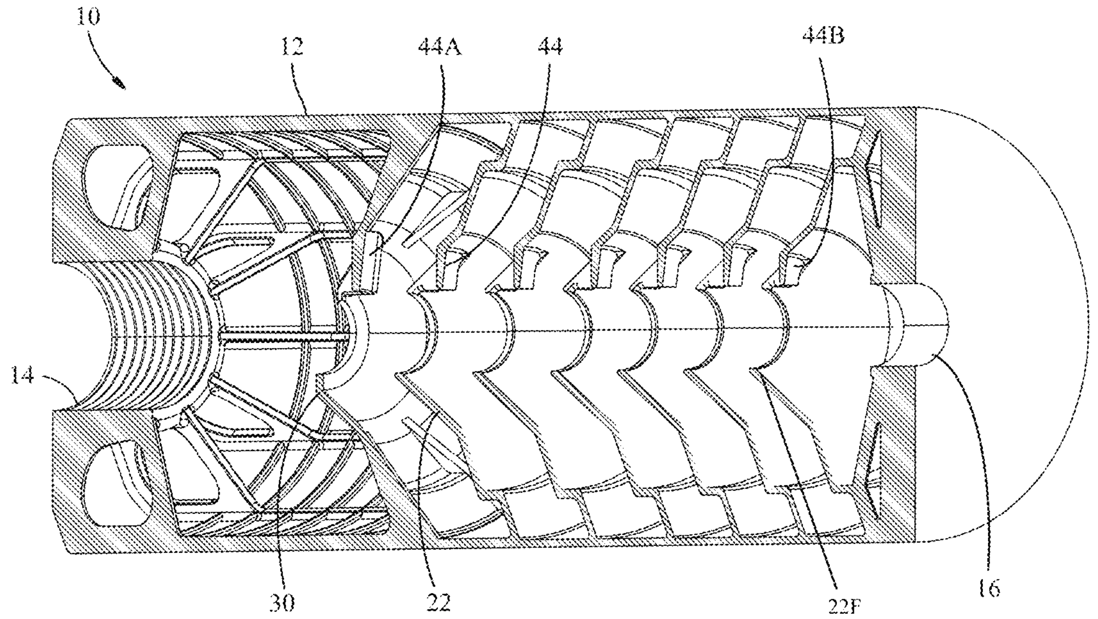
FIG. 6 is a cross-sectional distal perspective view of the suppressor, taken along line A-A of FIG. 2.

FIG. 6 is a distal perspective cross-sectional view of FIG. 3A. The length of the diversion wall 44 may vary among the plurality of baffles 22. The length of the diversion wall 44 is defined as the length between the first opening 46 and the second opening 48 provided by the diversion wall 44 within the deflecting channel 36. The volume V for each deflecting channel 36 is dependent on the length of that deflecting channel's 36 diversion wall 44. For instance, in FIG. 6, the diversion wall 44A formed in the deflecting channel 36 of the blast baffle 30 is longer than the diversion wall 44B formed in the deflecting channel 36 of the final downstream baffle 22F. The volume V of the deflecting channel 36 formed in the blast baffle 30 is thus greater than the volume V of the deflecting channel 36 formed in the final downstream baffle 22F. The purpose for the larger volume V in the deflecting channel 36 of the blast baffle 30 in comparison to the deflecting channels 36 in the downstream baffles 22 is that the blast baffle 30 receives the blunt majority of the propellant gases initially entering the suppressor 10 through the entrance port 14. A substantial majority of these gases will be deflected and diverted laterally away from the bore by the blast baffle 30 and the deflecting channel 36 formed therein. The need for deflecting channels 36 with large volumes V is not as demanding for the downstream baffles 22 given that by the time gases reach the downstream deflecting channels 36, the velocity of the gases has been slowed significantly by the upstream baffles 22, in particular, the blast baffle 30. In some alternative embodiments, the blast baffle 30 may be formed with the smallest volume V deflecting channel 36. In such embodiments, each downstream baffle 22 may include a deflecting channel 36 that has a volume V greater than that provided by the deflecting channel 36 of the blast baffle 30. These embodiments of a suppressor serve to maximize weight savings while maintaining sufficient decibel reduction.

Figure 7:
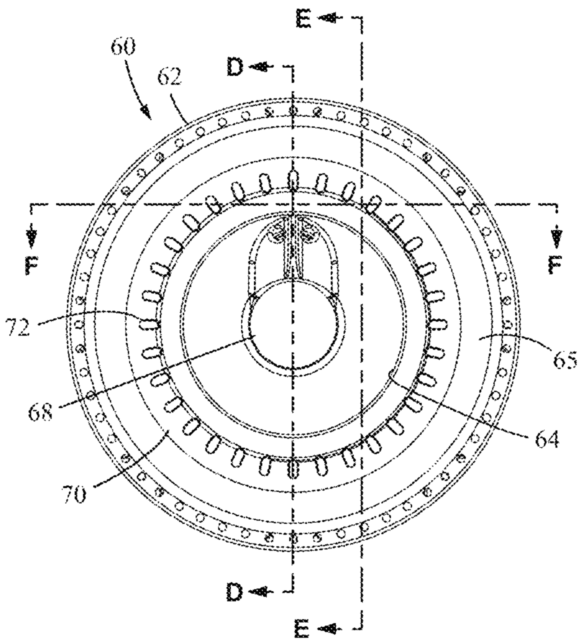
FIG. 7 is a distal end view of a second embodiment of a suppressor according to the present invention.

FIG. 7 is a distal end view of a second embodiment of a suppressor according to the present invention. Suppressor 60 is substantially similar to suppressor 10 described above. The suppressor 60 thus includes an outer shell 62. An exit port 64 is defined through the distal end 65 and is fluidically coupled to an entrance port 66 defined through the proximal end 67. A bore 68 is defined through the outer shell 62 to fluidically couple the entrance port 66 with the exit port 64, similar to that described above. Preferably, the bore 68 is linear and defines a longitudinal axis through the outer shell 62. The outer shell 62 is preferably cylindrical, similar to suppressor 10 above. A lattice structure 70 having a plurality of vent holes 72 may circumvolve the exit port 64. The vent holes 72 are in fluid communication with the internal volume of the outer shell 62 and may vent propellant gases traveling therethrough to the ambient environment.

Figure 8A:
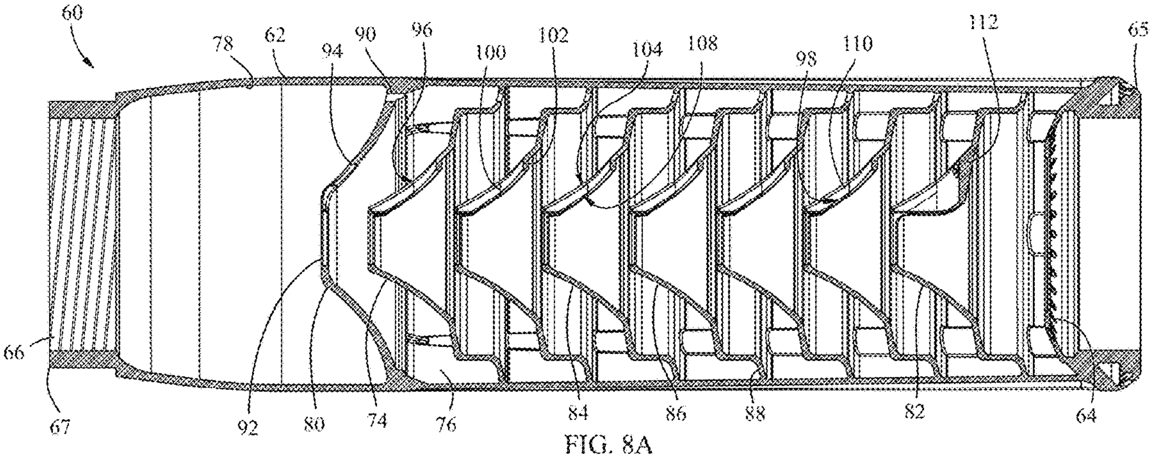
FIG. 8A is a cross-sectional side view of the second embodiment of the suppressor, taken along line D-D of FIG. 7.

FIG. 8A is a cross-sectional view, taken along line D-D, of the alternative embodiment of a suppressor according to the present invention. The outer shell 62 of the suppressor 60 encloses one or more baffles 74 that are aligned along the longitudinal axis between the entrance port 66 and the exit port 64. The baffles 74 are preferably axially spaced apart along the longitudinal axis, similar to that described above. An expansion chamber 76 is formed between any two adjacent baffles 74. The expansion chamber 76 should be understood to be the volume, or space, between any two adjacent baffles 74 and the inner surface 78 of the outer shell 62.

The entrance port 64 further includes a firearm mounting means, similar to that described above with regard to suppressor 10. The mounting means may include internal threads or an integrated quick-mount system, as is known in the industry. For simplicity's sake, the mounting means is shown as internal threads.

The suppressor 60 utilizes at least three distinct styles of baffles 74. The baffle closest to the entrance port 66 is referred to as the clipped baffle 80 while the baffle closest to the exit port 64 is referred to as the reinforced baffle 82. Each baffle positioned between the clipped baffle 80 and the reinforced baffle 82 with the suppressor 60 may be referred to as a primary baffle 84. Collectively, the clipped baffle 80, the reinforced baffle 82 and the primary baffles 84 may be generically referred to as baffles 74. In the illustrative embodiment shown in FIG. 8A, there are a total of eight baffles 74, which includes one clipped baffle 80, one reinforced baffle 82, and six primary baffles 84 arranged therebetween. The expansion chamber 76 is formed between any two adjacent baffles 74.

Each baffle 74 is made up of a truncated cone 86 and a flange 88 that extends from the truncated cone 86 to the inner surface 78 of the outer shell 62. Each flange 88 may be stepped, as shown in FIG. 8A. One or more apertures or vent holes 90 may be defined through each flange 88. The apertures 90 fluidically connect each expansion chamber 76 with one or more other expansion chambers 76 and further place the expansion chambers 76 in fluid communication with the entire volume enclosed by the outer shell 62. In some preferred embodiments, the apertures 90 defined through each flange 88 are axially aligned with one another along the longitudinal axis.

Each baffle 74 includes a central aperture 92 that circumvolves the bore 68. Preferably, the central apertures 92 are concentrically aligned around the bore 68. The central apertures 92 are further axially aligned with one another along the longitudinal axis.

The clipped baffle 80 is designed similar to conventional clipped baffles, such as those described above in the Background section. The clipped baffle 80 thus includes a clip or notch 94 formed in the truncated cone 86 and in fluid communication with the central aperture 92. The notch 94 forms a secondary flow path through the clipped baffle 80 that is offset from the bore 68.

In contrast, each primary baffle 84 has a deflecting channel 96 formed in its truncated cone 86 and in fluid communication with its central aperture 92 and thus the bore 68. Similarly, the reinforced baffle 82 has a reinforced deflecting channel 98 formed in its truncated cone 86 and in fluid communication with its central aperture 92. Each deflecting channel 96 and the reinforced deflecting channel 98 are axially offset from the bore 68. Each deflecting channel 96 has opposing sidewalls 100 formed in the truncated cone 86 and extending to a shortened diversion wall 102. Each shortened diversion wall 102 is designed to deflect gases perpendicular to the bore 68, similar to the diversion wall 44 described above. Similar to above, each deflecting channel 96 has a first opening 104 defined through an upstream surface of its truncated cone 86 and a second opening 108 that is in fluid communication with the bore 68. The first opening 104 is in fluid communication with the expansion chamber 76 formed between that primary baffle 84 and its adjacent upstream primary baffle 84 (or the clipped baffle 80). The reinforced deflecting channel 98 is similarly formed by opposing sidewalls 110 formed in its truncated cone 86 and extending to a reinforced diversion wall 112. The reinforced deflecting channel 98 also includes the first opening 104 and the second opening 108 as described above with regard to the primary baffles 84. The gas flow through suppressor 60 is described in more detail below.

Figure 8B:
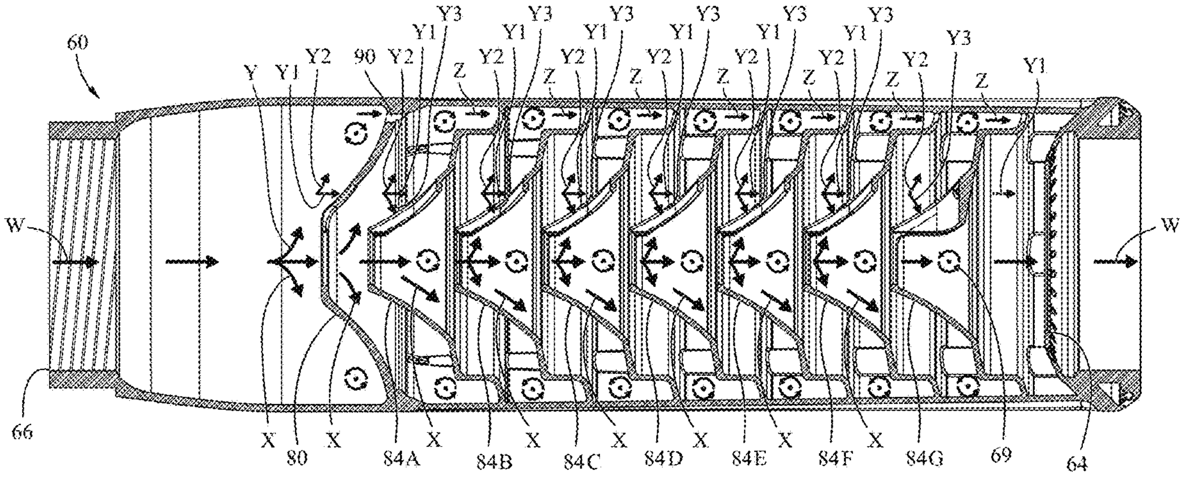
FIG. 8B is also a cross sectional side view of the second embodiment of the suppressor, taken along line D-D of FIG. 7, with markings indicating various flow paths through the suppressor.

FIG. 8B is a cross-sectional view taken along line D-D illustrating patterns of the various flow paths through suppressor 60. The primary flow path through suppressor 60 is flow path W. Similar to flow path A described above with regard to suppressor 10, flow path W follows the bore 68 through the length of the suppressor 60. The gas traveling along flow path W trails behind a projectile. Upon entering the suppressor 60, the gases impact the clipped baffle 80 and some amount of the gas is deflected radially outward along the upstream surface of the clipped baffle 80. Flow path W splits into various other flow paths upon impact with the clipped baffle 80. Some amount of this deflected gas will follow flow path X where the gas encounters the inner surface 78 of the outer shell 62 to be deflected and swirled back toward the bore 68. Additionally, some amount of the deflected gas will follow flow path Y through the notch 94 of the clipped baffle 80. At the clipped baffle 80, flow path Y splits into two different paths, flow path Y1 and flow path Y2. Gas following path Y1 continues forward through the notch 94 unimpeded while gas following flow path Y2 is deflected toward the inner surface 78 of the outer shell 62. Some amount of this deflected gas will be vented through the aperture 90 and continue along flow path Z through each subsequent aperture 90. Additionally, some amount of this gas is deflected by the inner surface 78 and swirled back toward the bore 68. Upon reaching the first primary baffle 84A, a third Y flow path is created by the deflecting channel 96. The flow path Y3 is generated when the gas impacts the shortened diversion wall 102 and is deflected through the second opening 108 back into the bore 68. This gas enters the bore 68 and creates a mixing zone 69 with the gas traveling along flow path W. Note, the mixing zone 69 is generally defined as the area below the second opening 108 within the bore 68. Additionally, gas is deflected through the first opening 104 following flow path Y2. This gas may be vented downstream through apertures 90 along flow path Z, deflected by the inner surface 78 to be swirled back toward the bore 68, or both. Given that the diversion wall 102 in suppressor 60 is shortened in comparison to the diversion wall 44 provided in suppressor 10, some amount of gas continues along flow path Y1 unimpeded.

The flow generally described above is true for each of the primary baffles 84A through 84F. Upon the gas traveling along flow path Y1 reaching the reinforced baffle 82, the reinforced diversion wall 112 deflects a majority of this gas laterally. A majority of this gas is diverted along flow path Y2 and flow path Y3 while a small amount of the gas continues along flow path Y1 through vent holes 118 defined through the reinforced diversion wall 112 (see FIG. 9).

In contrast to suppressor 10 described above, the gas traveling through the deflecting channels 96 of the primary baffles 84A through 84F remains high energy due to the smaller sized diversion wall 102 provided therein. A majority of the gas may travel substantially unimpeded along flow path Y1 and flow path W through suppressor 60 until reaching the reinforced baffle 82. The gas traveling along flow path Y1 impacts the reinforced diversion wall 112 with high energy and is the reason the diversion wall 112 requires reinforcement in the form of a support fin 114 on the downstream surface (see FIG. 9). The gas deflected into flow path Y3 creates a final mixing zone 69 within the bore 68 to disrupt the gas along flow path W prior to being ejected from the exit port 64.

Figure 9:
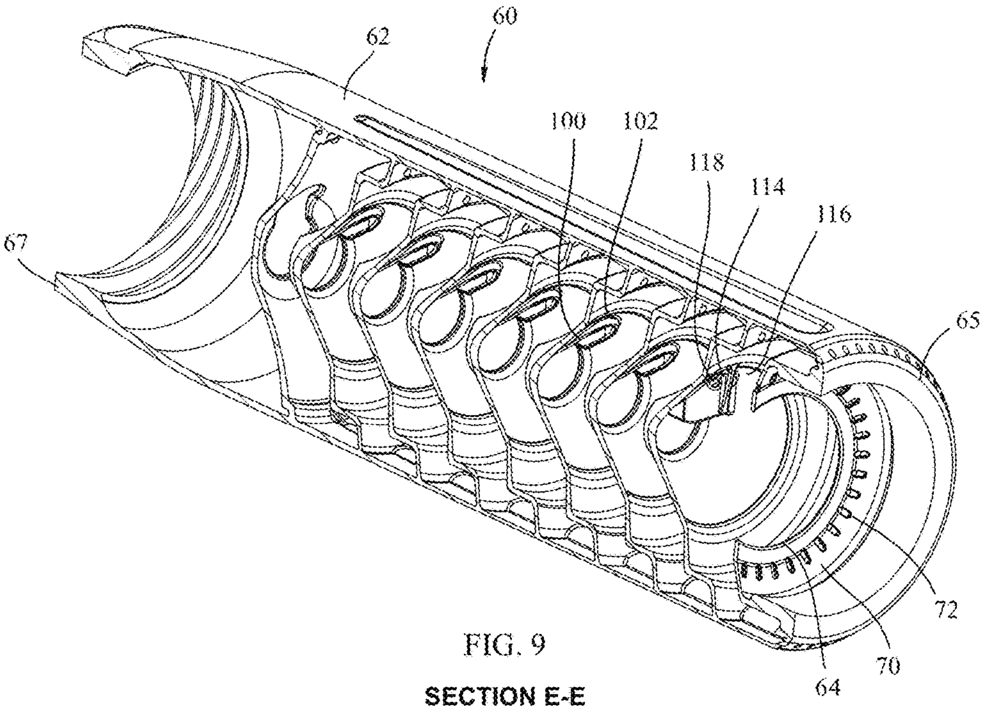
FIG. 9 is a cross-sectional distal end perspective view of the second embodiment of the suppressor, taken along line E-E of FIG. 7.

FIG. 9 is a distal end cross-sectional perspective view, taken along line E-E, of the second embodiment of a suppressor according to the present invention. As stated above, the reinforced diversion wall 112 may include a support fin 114 formed on the downstream surface. The support fin 114 is integrated with the downstream surface of the reinforced diversion wall 112 and the downstream surface 116 of the truncated cone 86 forming the reinforced baffle 82. In alternative embodiments, there may be more than one support fin 114 formed on the downstream surface of the reinforced diversion wall 112. In some embodiments, the reinforced diversion wall 112 has one or more vent holes 118 defined therethrough. The vent holes 118 fluidically couple the exit port 64 with the reinforced deflecting channel 98.

Figure 10:
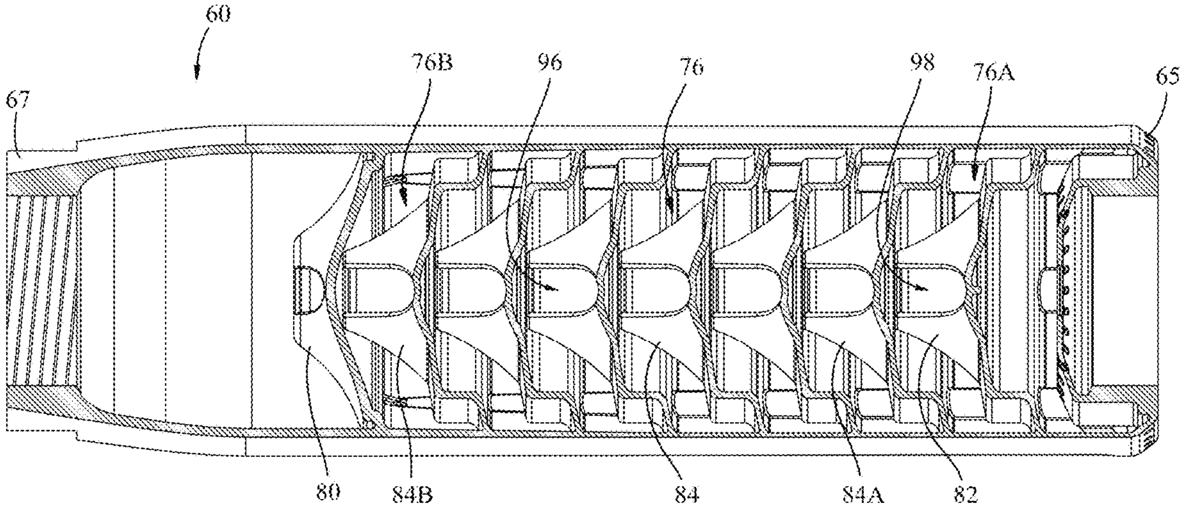
FIG. 10 is a top-down cross-sectional side view of the second embodiment of the suppressor, taken along line F-F of FIG. 7.

FIG. 10 is a cross-sectional view, taken along line F-F, of suppressor 60. As briefly discussed above, the plurality of baffles 74 enclosed within the outer shell 62 are axially separated. In some embodiments, the axial separation between adjacent baffles 74 is uniform among the plurality of baffles 74. In alternative embodiments, the axial separation between adjacent baffles 74 may differ among the plurality of baffles 74. The difference in axial separation between adjacent baffles 74 causes a corresponding change to the volume of the expansion chamber 76 formed therebetween. In some preferred embodiments, the volume of each expansion chamber 76 diminishes in the direction of the exit port 64. For example, the volume of expansion chamber 76A formed between primary baffle 84A and the reinforced baffle 82 may be smaller than the volume of expansion chamber 76B formed between the clipped baffle 80 and primary baffle 84B. In alternative embodiments, the opposite may be true where expansion chamber 76A has a volume greater than expansion chamber 76B. In such an embodiment, the axial separation between adjacent baffles 74 increases in the direction of the exit port 64.

In preferred embodiments of the suppressor 60, each of the deflecting channels 96 and the reinforced deflecting channel 98 have an oblong profile. This is contrasted with the rectangular profile provided by the deflecting channels 36 in suppressor 10, e.g., FIG. 4. The rounded edges of the oblong deflecting channels 96 and the oblong reinforced deflecting channel 98 provides for a more controlled deflection and disruption of propellant gases flowing through suppressor 60. Instead of the gas being violently redirected upon encountering a sharp edge, the rounded edges of the deflecting channels 96 and the reinforced deflecting channel 98 promote a swirling flow of the gas, which has the effect of causing the gas to collide with itself further dissipating the energy of the gas. In contrast, the sharper edges provided by the rectangular profile of the deflecting channels 36 in suppressor 10 are designed to maximize turbulence in the gas flow to achieve high levels of decibel reduction. The tradeoff is that the sharper edges of the deflecting channels 36 may increase the backpressure, which may result in the operator experiencing a blowback effect where the excess backpressure is vented through the firearm breech into the operator's face.

Figure 11:
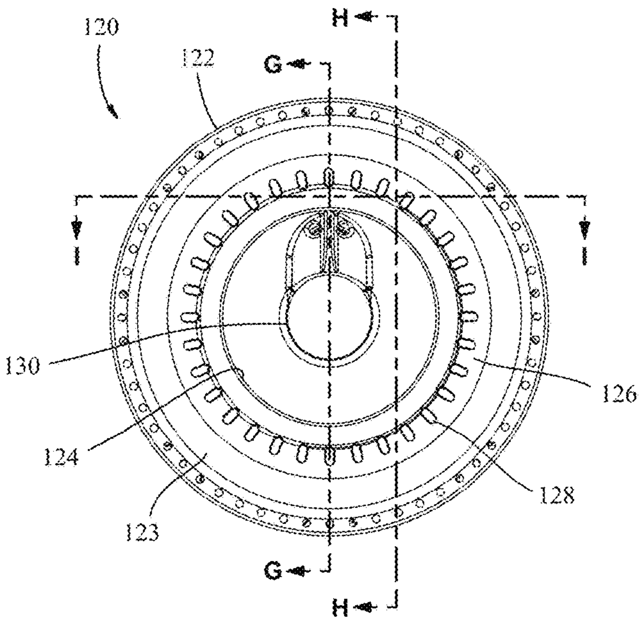
FIG. 11 is a distal end view of a third embodiment of a suppressor according to the present invention.

In further alternative embodiments, each baffle enclosed within an outer shell may be reinforced. FIG. 11 is a distal end view of a third embodiment of a suppressor according to the present invention. The reinforced suppressor 120 is substantially similar to suppressor 10 and suppressor 60 described above. The reinforced suppressor 120 thus includes an outer shell 122 that has an exit port 124 defined through the distal end 123. The outer shell 122 is preferably cylindrical, similar to suppressor 10 and suppressor 60 described above. A lattice structure 126 having a plurality of vent holes 128 may circumvolve the exit port 124. A bore 130 is defined through the outer shell 122 and fluidically couples the exit port 124 with an entrance port 132 formed through the proximal end 133 of the outer shell 122. The bore 130 defines the longitudinal axis through the reinforced suppressor 120. Preferably, the bore 130 is linear.

Figure 12A:
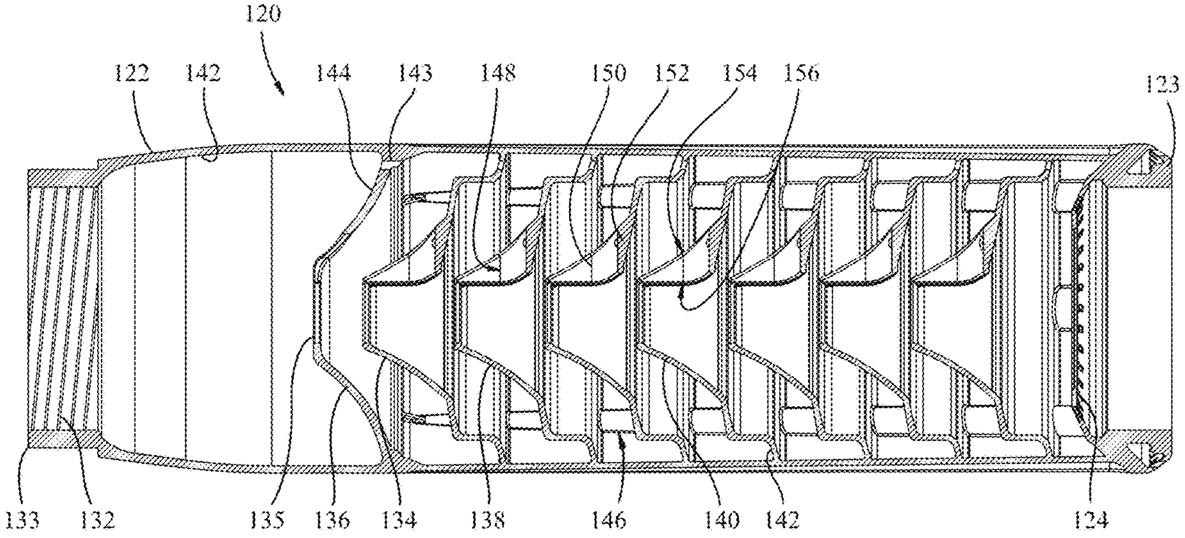
FIG. 12A is a cross-sectional side view of the third embodiment of the suppressor, taken along line G-G of FIG. 11.

FIG. 12A is a cross-sectional side view, taken along line G-G, of the third embodiment of a suppressor according to the present invention. The reinforced suppressor 120 has attributes of both suppressor 10 and suppressor 60 described above. The outer shell 122 thus encloses a plurality of baffles 134 that are arranged along the longitudinal axis between the entrance port 132 and the exit port 124. The baffles 134 each have a central aperture 135 that circumvolves the bore 130. The baffles 134 are made up of at least one clipped baffle 136 and one or more reinforced primary baffles 138. Note, in the context of the reinforced suppressor 120, reference to baffles 134 is meant to generally refer to both the clipped baffle 136 and the one or more reinforced primary baffles 138.

The baffles 134 are generally made up of a truncated cone 140 and a flange 142 extending from the truncated cone 140 to the inner surface 142 of the outer shell 122. In some embodiments, such as the one shown in the figures, the flange 142 may be stepped. An expansion chamber 146 is formed between any two adjacent baffles 134. An expansion chamber 146 should be understood to mean the volume, or space, between any two adjacent baffles 134 and the inner surface 142 of the outer shell 122. In some embodiments, each expansion chamber 146 formed within the reinforced suppressor 120 may have an equal volume. In alternative embodiments, the volume of each expansion chamber 146 may diminish in the direction of the exit port 124. Each flange 142 may include one or more vent holes 143 that fluidically couple adjacent expansion chambers 146 together. In some embodiments, the vent holes 143 defined through each flange 142 are axially aligned with one another.

The clipped baffle 136 has a clip or a notch 144 defined through its truncated cone 140. The notch 144 is in fluid communication with the central aperture 135 defined through the clipped baffle 136. The notch 144 forms a secondary flow path through the clipped baffle 136 that is axially offset from the primary flow path provided through the bore 130.

In contrast, each of the reinforced primary baffles 138 includes a reinforced deflecting channel 148 formed in the truncated cone 140 and in fluid communication with the central aperture 135 thereof. Each reinforced deflecting channel 148 is axially offset from the bore 130. Each reinforced deflecting channel 148 is formed of opposing sidewalls 150 that are formed in an upstream surface of the truncated cone 140 and extend to a reinforced diversion wall 152. The reinforced diversion wall 152 extends between a first opening 154 defined through the upstream surface of the truncated cone 140 and a second opening 156. The second opening 156 fluidically couples its reinforced deflecting channel 148 with its central aperture 135, and thus the bore 130. Similar to that described above, each reinforced deflecting channel 148 is designed to deflect gases laterally in a direction perpendicular to the bore 130. Preferably, the reinforced deflecting channels 148 formed among the plurality of reinforced primary baffles 138 are axially aligned with one another.

Figure 12B:
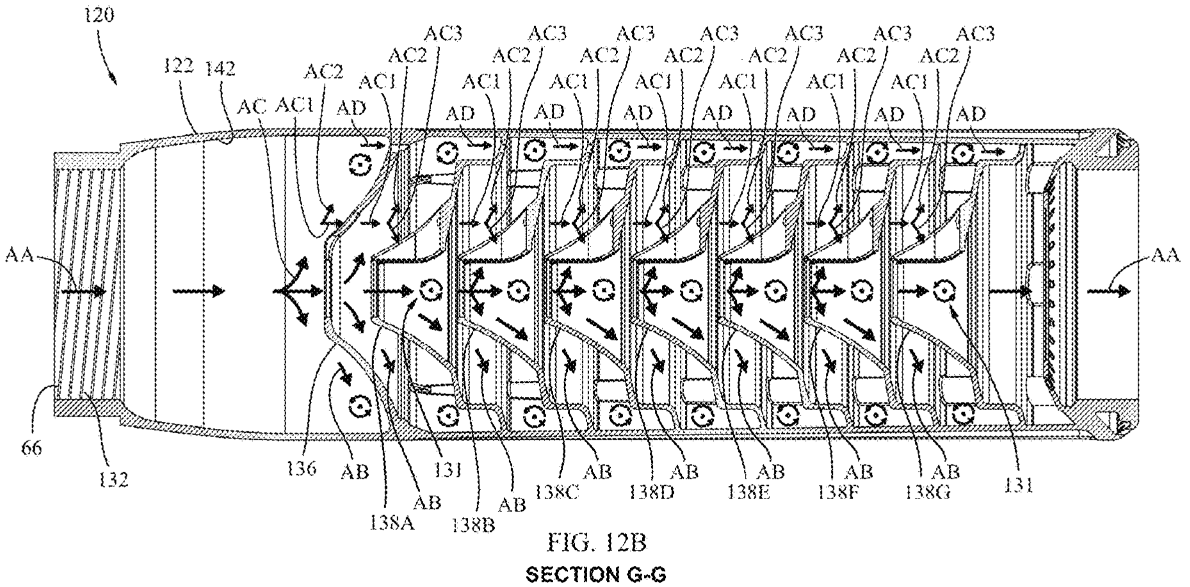
FIG. 12B is also a cross sectional side view of the third embodiment of the suppressor, taken along line G-G of FIG. 11, with markings indicating the various flow paths through the suppressor.

FIG. 12B is a cross-sectional side view similarly taken along line G-G. FIG. 12B illustrates the potential flow path patterns through the reinforced suppressor 120 according to the present invention. The flow paths through the reinforced suppressor 120 are similar to the flow paths through suppressor 10 described above, see, e.g., FIG. 3B above. The primary flow path is labeled AA and generally follows the longitudinal axis through the bore 130. The flow path AA splits into various other flow paths upon encountering a baffle 134. More specifically, gases traveling along flow path AA first encounter the clipped baffle 136 and are laterally deflected outward into flow path AB and flow path AC. Flow path AB continues along the upstream surface of the clipped baffle 136 until encountering the inner surface 142 of the outer shell 122, where the gases swirl and are deflected back toward flow path AA, i.e., back toward the bore 130. For the clipped baffle 136, flow path AC splits into flow path AC1 and flow path AC2. Gases traveling along flow path AC1 continue forward through the notch 144. Some amount of the gas traveling along flow path AC is further deflected into flow path AC2 where it may reach the inner surface 142 of the outer shell 122 to be swirled and redirected back toward flow path AA, i.e., back toward the bore 130. Additionally, some amount of the gas traveling along flow path AC2 will travel along flow path AD through the vent holes 143 defined through the flange 142. This gas may continue along flow path AD through the series of axially aligned vent holes 143. At any point, gas traveling along flow path AD may be deflected and swirled back toward the bore 130.

The gas traveling along flow path AC1 continues forward reaching the reinforced deflecting channel 148 of the first reinforced primary baffle 138A. Additionally, some amount of gas traveling along flow path AA will be deflected into flow path AC upon encountering the upstream surface of the first reinforced primary baffle 138A. The gas entering the reinforced deflecting channel 148 will be deflected laterally into flow path AC2 and flow path AC3. Gas deflected into flow path AC2 will flow as described above and thus may reach the inner surface 142 before swirling and being deflected back toward the bore 130. Further, gas traveling along flow path AC2 may mix with the gas traveling along flow path AD and be vented forward into the adjacent downstream expansion chamber 146. The gas deflected into flow path AC3 is reintroduced into the bore 130 where it creates a mixing zone 131 with the gas traveling along flow path AA within the bore 130. As noted above, the mixing zone 131 is generally defined as the area below the second opening 156 within the bore 130. The gases deflected into flow path AC3 into the mixing zone 131 create increased turbulence in the gas flow trailing behind a projectile, which increased turbulence promotes further radial deflection by the downstream reinforced primary baffles 138.

In some embodiments, some amount of gas traveling along flow path AC1 will continue forward through the reinforced deflecting channel 148. In such an embodiment, one or more vent holes may be defined through the reinforced diversion wall 152, which vent holes allow for the unimpeded passage of gas along flow path AC1.

The general flow through the first reinforced primary baffle 138A described above is true for each subsequent reinforced primary baffle 138, e.g., 138B through 138G in FIG. 12B, that is enclosed by the outer shell 122 to form the reinforced suppressor 120. The suppressor 120 thus reduces the decibel output by substantially reducing the velocity and temperature of the gas prior to the gas being ejected from the exit port 124.

Figure 13:
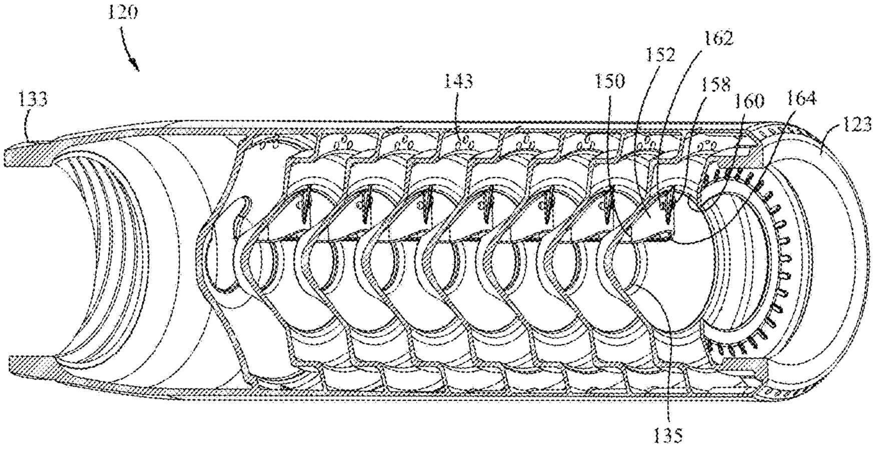
FIG. 13 is a cross-sectional distal end perspective view of the third embodiment of the suppressor, taken along line H-H of FIG. 11.

FIG. 13 is a distal perspective cross-sectional view, taken along line H-H, of the third embodiment of a suppressor. Each reinforced deflecting channel 148 is made up of opposing sidewalls 150 formed in the truncated cone 140 and extending to a reinforced diversion wall 152. Each reinforced diversion wall 152 has a support fin 158 formed on the downstream surface and connected to the downstream surface 160 of its truncated cone 140. The support fin 158 structurally reinforces the reinforced diversion wall 152 by connecting the wall to the downstream surface 160 of its truncated cone 140. This ensures that the reinforced diversion walls 152 are structurally sound and capable of withstanding repeated impacts from hot propellant gases traveling through the reinforced suppressor 120.

In some embodiments, each reinforced diversion wall 152 includes one or more vent holes 162 defined therethrough. The vent holes 162 fluidically couple that reinforced deflecting channel 148 with the adjacent downstream expansion chamber 146. Turning back to FIG. 12B discussed above, some amount of gas traveling along flow path AC1 will continue forward through the vent holes 162 unimpeded. The gas traveling through vent holes 162 along flow path AC1 will mix downstream with gas deflected from flow path AA into flow path AC where the gas will encounter a downstream reinforced deflecting channel 148 and may be diverted into any one of flow paths AC1, AC2, and AC3. Preferably, the vent holes 162 through each reinforced diversion wall 152 are axially aligned with one another.

In some preferred embodiments, the lower end 164 of each reinforced diversion wall 152 forms a perimetric edge of the central aperture 135. A bullet fired through the reinforced suppressor 120 thus may travel freely through the bore 130 without interference.

Figure 14:
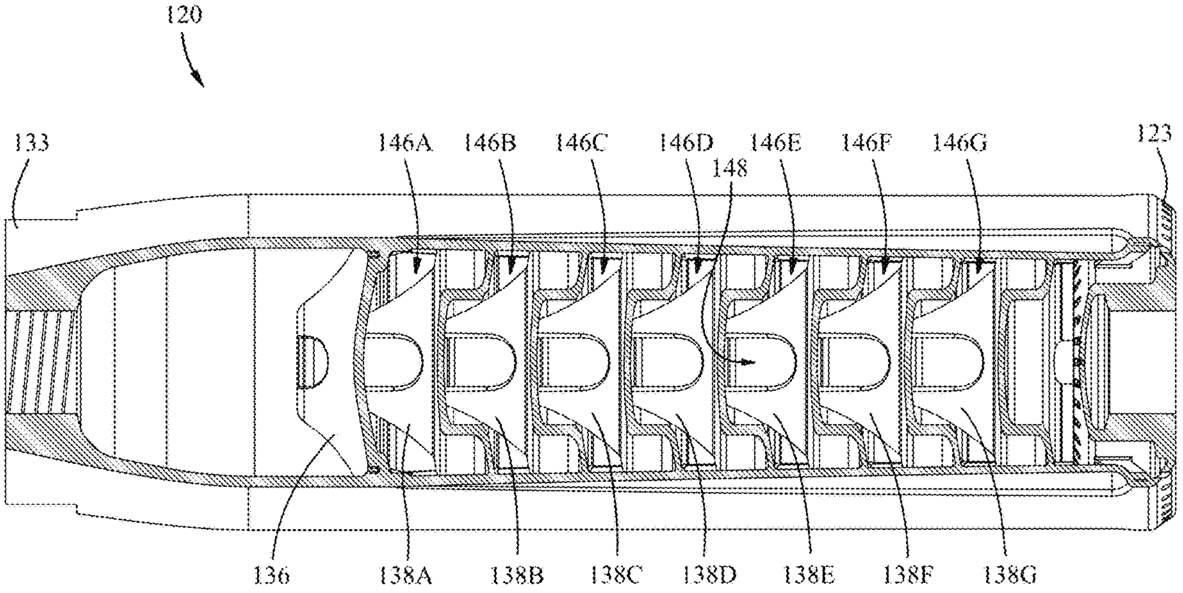
FIG. 14 is a top-down cross-sectional side view of the third embodiment of the suppressor, taken along line I-I of FIG. 11.

FIG. 14 is a top-down cross-sectional view, taken along lines I-I, of the third embodiment of a suppressor according to the present invention. In preferred embodiments, the baffles 134 are axially spaced apart within the outer shell 122. The axial spacing between adjacent baffles 134, e.g., between the clipped baffle 136 and the first reinforced primary baffle 138A, may be uniform among the plurality of baffles 134. In such embodiments, the volume of each expansion chamber 146 is similarly uniform. In alternative embodiments, the axial spacing between any two adjacent baffles 134 may diminish in the direction of the exit port 124, e.g., spacing between the clipped baffle 136 and the first reinforced primary baffle 138A may be greater than the spacing between the sixth reinforced primary baffle 138F and the seventh reinforced primary baffle 138G. The volume of each expansion chamber 146 may similarly diminish as the axial spacing between adjacent baffles 134 diminishes.

In some preferred embodiments, each reinforced deflecting channel 148 has an oblong profile, similar to that described above with regard to suppressor 60. Similar to suppressor 60, the rounded edges of the reinforced deflecting channel 148 promote a swirling flow of the gas, which has the effect of causing the gas to collide with itself further dissipating energy.

In each of the aforementioned embodiments of a suppressor according to the present invention, the preferred method of manufacture is an additive manufacturing process, such as 3-D printing. Alternative methods of manufacture may include machining using a multi-axis computer numerical control ("CNC") machine. The 3-D printing process is preferred, however, to allow for manufacturing of the complex internal geometry provided by any of the aforementioned suppressor embodiments while maintaining high levels of structural integrity and durability. In some embodiments, the 3-D printing process uses one or more high grade metal or metal alloy powders to ensure the structural integrity of the suppressor without adding significant weight thereto. In some embodiments, the metal powders are titanium and/or stainless steel powders. In preferred embodiments, the Haynes® 282® metal alloy in powder form or the Inconel® 718 metal alloy in powder form is used for 3-D printing a suppressor according to the present invention. In preferred embodiments, the outer shell and all internal components are integrally formed as a single unit according to the 3-D printing process. This ensures the internal components, i.e., the baffles, are properly maintained with their central apertures concentrically aligned around the bore. This baffle positioning is maintained through repeated uses of the suppressor by integrating the radial ends of each flange with the inner surface of the outer shell.

In any of the aforementioned suppressor embodiments, the suppressor may be designed to be compatible with virtually any conventional or unconventional caliber of bullet. The bore of any of the aforementioned suppressor embodiments is thus sized to match the bore of the firearm with which that suppressor has been designed for use on.

The purpose of all of the previously described suppressors according to the present invention is to reduce the decibel output produced upon propellant gases being released through the exit port. The baffles are designed to disrupt the normal flow of propellant gas through the suppressor to reduce the velocity, temperature, and pressure of the gas prior to release into the ambient environment. The effectiveness of this disruption can be quantified by the Reynolds number, which is a dimensionless number used to predict fluid flow. A high Reynolds number, e.g., 4,000 and above, is indicative of turbulent flow while a low Reynolds number, e.g., 2,000 and under, is indicative of laminar flow. The Reynolds number is calculated according to the following equation: $Re=(\rho*v*L)/\mu$; where Re is the Reynolds number, $\rho$ is the density of the fluid, v is the flow velocity, L is a characteristic length, and $\mu$ is the dynamic viscosity of the fluid. Conventional suppressors have an extremely high Reynolds number, e.g., in excess of 10,000, thus indicating the ineffectiveness of such suppressors. A suppressor according to the present invention influences the Reynolds number for the gases traveling therethrough by altering the velocity, the temperature, and the pressure of this gas based on the internal geometry of the suppressor.

The Reynolds number is directly impacted by the influence a suppressor according to the present invention has on the velocity of the gas traveling therethrough. As this gas impacts one or more baffles and is deflected by one or more of the deflecting channels, the velocity of the gas is slowed. A suppressor according to the present invention also influences the pressure and temperature of the gas as it moves therethrough. In the context of a suppressor, gas pressure may be calculated according to the following equation, which is a variation of the Ideal Gas Law equation: $P=(\rho*R*T)/M$; where P is the pressure of the gas; $\rho$ is the density of the gas; R is the ideal gas constant; T is absolute temperature in Kelvin; and M is the molar mass of the gas. As the gas encounters various surfaces internal to the suppressor, e.g., the baffles and their deflecting channels, heat from the gas is transferred to the internal surfaces of the suppressor, reducing the absolute temperature T of the gas. This causes a reduction to the gas pressure which has the effect of reducing the density of the gas ($\rho$ of the Reynolds number equation), resulting in a less turbulent flow through the suppressor as indicated by a lower Reynolds number.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fluid pressure dampener, comprising:

an outer shell enclosing a volume and having an entrance port and an exit port;

a bore defined through the outer shell and fluidically connecting the entrance port and the exit port, the bore defining a longitudinal axis of the dampener;

one or more baffles enclosed within the outer shell, each of the one or more baffles having a central aperture circumvolving the bore and a deflecting channel formed in the baffle and radially offset from the bore, the deflecting channel having a first opening, a second opening, a diversion wall extending between the first opening and the second opening, and opposing sidewalls extending from the central aperture to the diversion wall, wherein the first opening is in fluid communication with the enclosed volume and the second opening is in fluid communication with the bore defined through that baffle.

2. The fluid pressure dampener of claim 1, further comprising a plurality of baffles arranged within the outer shell between the entrance port and the exit port.

3. The fluid pressure dampener of claim 2, wherein the baffles are spaced apart along the longitudinal axis.

4. The fluid pressure dampener of claim 3, wherein the deflecting channels formed in the baffles are axially aligned.

5. The fluid pressure dampener of claim 3, further comprising at least two different volumes of deflecting channels.

6. The fluid pressure dampener of claim 5, wherein the volume of the deflecting channels is a function of baffle axially displacement from the entrance port.

7. The fluid pressure dampener of claim 3, further comprising an expansion chamber formed between any two adjacent baffles among the plurality of baffles.

8. The fluid pressure dampener of claim 7, wherein the deflecting channel formed on an upstream baffle extends partially into the expansion chamber formed between the upstream baffle and an adjacent downstream baffle.

9. The fluid pressure dampener of claim 1, wherein the at least one baffle comprises a truncated cone concentrically aligned with the longitudinal axis.

10. The fluid pressure dampener of claim 9, wherein the first opening is formed through an upstream surface of the cone.

11. The fluid pressure dampener of claim 1, wherein the diversion wall is substantially perpendicular to the longitudinal axis.

12. The fluid pressure dampener of claim 1, wherein the diversion wall is configured to divert gases in a direction perpendicular to the bore.

13. The fluid pressure dampener of claim 1, wherein the diversion wall further comprises a support fin formed on a downstream surface of the diversion wall and connected to an inner surface of the baffle.

14. The fluid pressure dampener of claim 1, further comprising at least one port defined through the diversion wall.

15. A baffle for a fluid pressure dampener, comprising:

a flange surface;

a body extending from the flange surface, the body having a central aperture defining a flow axis; and a deflecting channel formed in the body and in fluid communication with the central aperture, the deflecting channel offset from the flow axis and having a first opening, a second opening, a diversion wall extending between the first opening and the second opening, and opposing sidewalls extending from the central aperture to the diversion wall.

16. The baffle of claim 15, wherein the diversion wall is substantially perpendicular to the flow axis.

17. The baffle of claim 15, further comprising a support fin formed on a downstream surface of the diversion wall and integrally extending from the flange surface.

18. The baffle of claim 15, wherein an end of the diversion wall forms a perimetric edge of the central aperture.

19. The baffle of claim 15, wherein the deflecting channel is configured to divert gases in a direction perpendicular to the flow axis.

20. The fluid pressure dampener of claim 1, wherein the deflecting channel comprises an oblong profile.

* * * * *